(No Model.)

E. FISCHER.
TIRE TIGHTENER.

No. 510,473. Patented Dec. 12, 1893.

Witnesses
Wm. L. Snider
Van Buren Hillyard

Inventor
Emil Fischer
By Attorneys
R.S. & A.B. Lacey

UNITED STATES PATENT OFFICE.

EMIL FISCHER, OF HALLSVILLE, ILLINOIS.

TIRE-TIGHTENER.

SPECIFICATION forming part of Letters Patent No. 510,473, dated December 12, 1893.

Application filed August 14, 1893. Serial No. 483,107. (No model.)

*To all whom it may concern:*

Be it known that I, EMIL FISCHER, a citizen of the United States, residing at Hallsville, in the county of De Witt, State of Illinois, have invented certain new and useful Improvements in Rim-Tighteners; and I do hereby declare the following to be a full, clear, and exact description of the invention, such as will enable others skilled in the art to which it appertains to make and use the same.

This invention relates to devices for tightening vehicle rims.

It is well known that vehicle wheels after being in constant use for a length of time and subjected to wet and dry seasons shrink in a protracted dry spell to such an extent that appreciable spaces are formed between the meeting ends of the rim sections thereby endangering the stability of the wheel when subjected to lateral strain.

The object of the present invention is to provide a simple and efficient contrivance for temporarily filling the space between the rim sections during a dry spell and which can be readily removed when the said rim sections expand in a wet season and close the space between the meeting ends.

The improvement consists of the novel features and the peculiar construction and combination of the parts which will be hereinafter more fully described and claimed and which are shown in the annexed drawings, in which—

Figure 1:
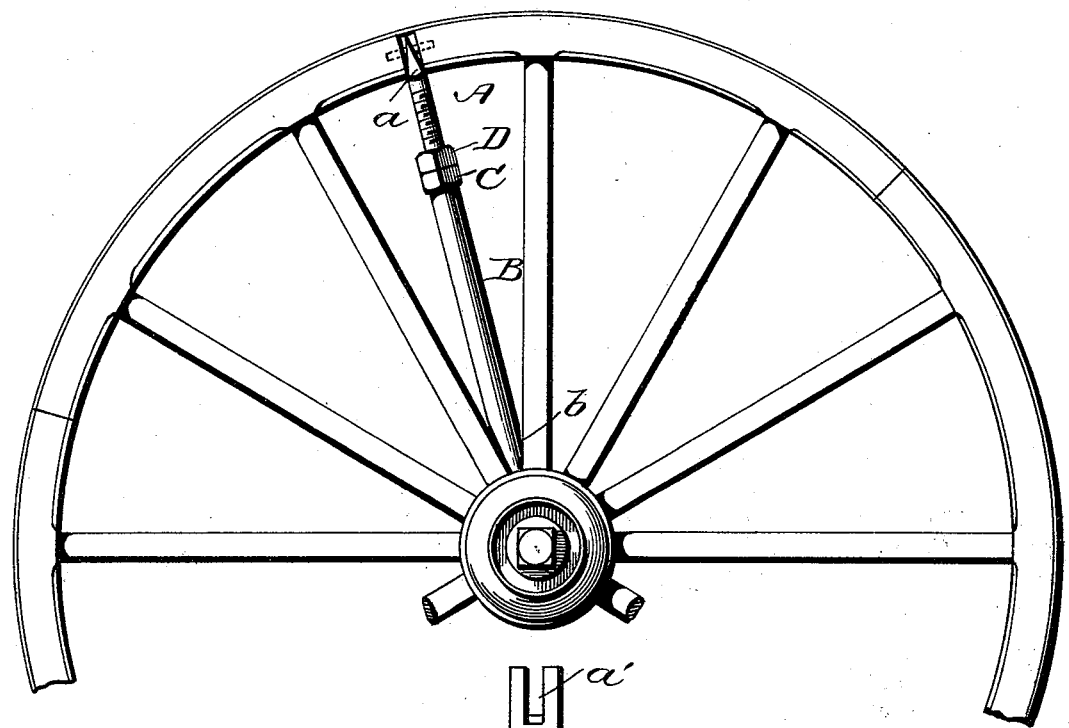
Figure 2:
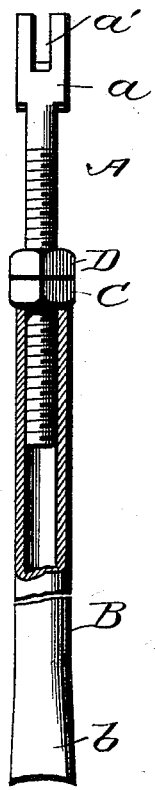

Figure 1 is a side elevation of a portion of a wheel showing the application of the invention. Fig. 2 is a front view of the rim tightener, a portion of the tubular section being broken away.

The rim tightener is composed of the two sections A and B which are relatively adjustable to increase or diminish the length of the tightener as required. The section B is tubular and closed at its lower end which tapers so as to enter the angle formed between two contiguous spokes without creating lateral pressure thereon. The tapering end $b$ is depressed slightly to conform to the curvature of the hub and enable the device to obtain a firm purchase thereon. The section A is threaded and is adapted to enter the open end of the tubular section B. The end $a$ of the section A is wedge shape to enter the space between the rim section of the wheel and is provided in its penetrating end with a notch $a'$ to give clearance for the tenon or dowel between the said rim sections. A nut C mounted on the threaded portion of the section A obtains a purchase on the end of the tubular section B and is adapted to be rotated to lengthen or shorten the tightener. A jam nut D is provided and mounted on the said threaded section A to secure the parts in the adjusted position.

In the application of the device for tightening the rim of a vehicle wheel should a space be provided between the opposing ends of the rim sections the tightener is adjusted between the spokes in the plane of the wheel with the tapering end $b$ resting against the hub, and the wedge shaped end $a$ opposite the space between the rim sections. On turning the nut C in the proper direction the tightener will be lengthened and the wedge shaped end $a$ forced more or less into the said space. After the rim has been properly tightened the jam nut D is turned to bind upon the nut C and hold the parts in the adjusted position. Should the rim section expand from any cause the tightener can be readily removed by loosening the nuts D and C which will cause the tightener to shorten and permit of its removal in the manner readily understood.

Having thus described my invention, what I claim, and desire to secure by Letters Patent, is—

The herein described rim tightener composed of a tubular section having one end tapering and depressed, and having the opposite end opened, a second section having a threaded portion to work in the open end of the tubular section, and having a wedge shaped end provided with a notch to receive the dowel between the rim sections, and an adjusting nut and a jam nut on the said threaded portion, substantially as and for the purpose set forth.

In testimony whereof I affix my signature in presence of two witnesses.

EMIL FISCHER.

Witnesses:
 MAXWELL HAMILTON,
 C. G. SAMUEL.